Feb. 14, 1956   M. L. DOELZ ET AL   2,734,379
DISC HOLDING AND FREQUENCY MEASURING APPARATUS
Filed April 24, 1952

INVENTORS
MELVIN L. DOELZ
FRANK C. WALLACE
BY
ATTORNEY

United States Patent Office 2,734,379
Patented Feb. 14, 1956

2,734,379
DISC HOLDING AND FREQUENCY MEASURING APPARATUS

Melvin L. Doelz, Glendale, and Frank Charles Wallace, North Hollywood, Calif., assignors to Collins Radio Company, Cedar Rapids, Iowa, a corporation of Iowa Application April 24, 1952, Serial No. 284,082

3 Claims. (Cl. 73—67)

This invention relates in general to frequency measuring apparatus and in particular to apparatus for measuring the frequency of discs for electromechanical filters.

The co-pending application of Melvin L. Doelz entitled "Mechanical Filters," Serial Number 248,011, filed September 24, 1951, discloses an electromechanical filter wherein the mechanical vibrations of discs are used in electrical circuits as filtering element.

The co-pending application of Robert L. Campbell entitled "Frequency Measuring Apparatus," Serial Number 172,984, filed July 10, 1950, now Patent No. 2,712,753, discloses a frequency measuring device wherein an input driving means couples energy to a disc and an output coupling means receives energy from the disc.

The present invention is an improvement on this invention in that it allows the discs to be removed from the relatively small driving and output rods without bending them.

Another basic difference between the present invention and the Campbell apparatus is that the disc being measured rests on a pair of magnetostrictive rods and is held there by gravity rather than by having the two rods pressed against the disc's surfaces, as occurs in the Campbell structure. Thus, the present invention results in smaller and better controlled coupling between the driving rods and the disc which allows the disc to vibrate very near its natural resonant frequency and thus improves the accuracy of the measurement.

A feature of this invention is found in the provision for a clamping device adapted to receive a disc and hold it until it is dropped into a slot through which a pair of magnetostrictive wires extend, and to release and subsequently pick up the disc and remove it from the slot.

An object of this invention is to provide a feed mechanism which releases and picks up discs at the testing station of a device for measuring the mechanical frequency of said disc.

Figure 1:
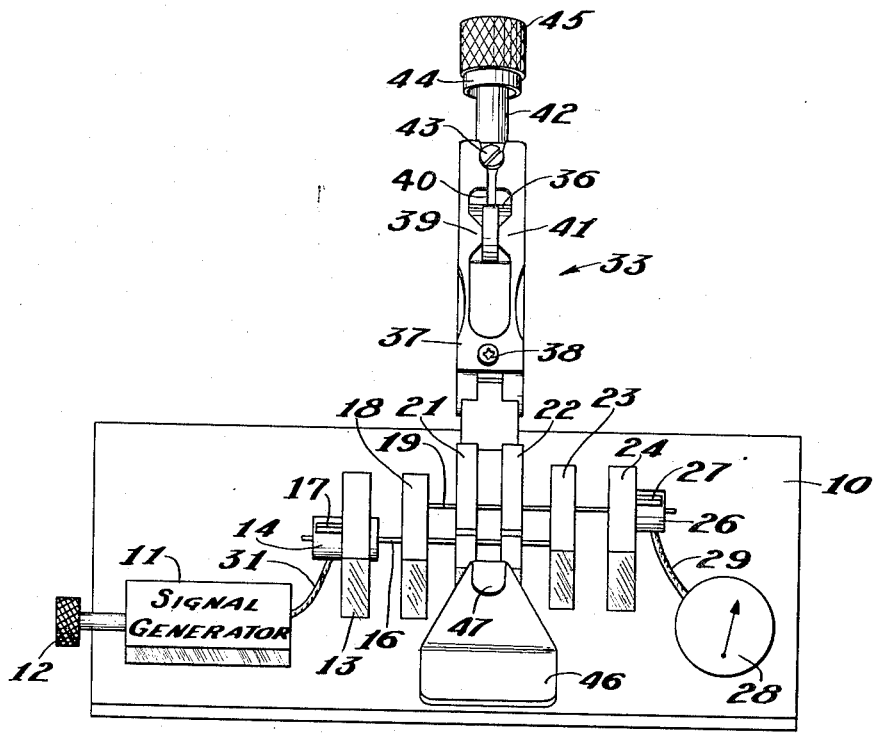
Figure 2:
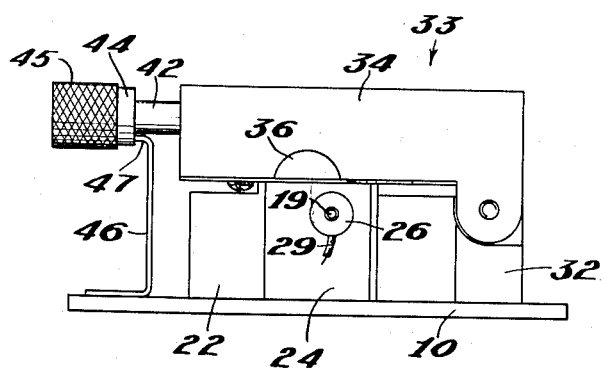

Further objects, features and advantages of this invention will become apparent from the following description and claims when read in view of the drawings, in which:

Figure 1 is a view taken at a 45 degree angle from the horizontal plane showing the disc holding mechanism in the upper position, and Figure 2 is an end view showing the disc holding plunger in the down position.

Figure 1 illustrates a base plate 10 upon which is mounted a signal generator 11. A control knob 12 is connected to generator 11 and controls its output frequency.

A first stand-off 13 supports a magnetostrictive driving unit 14, through which a driving wire 16 extends.

A polarizing magnet 17 is mounted adjacent the driving means 14. For a more complete description of this driving means reference may be made to the above referenced Doelz application.

A second stand-off 18 is mounted on the plate 10 and has a clearance opening through which the driving wire 16 extends without touching it. An output wire 19 is attached to the stand-off 18.

A pair of guide members 21 and 22, respectively, are mounted to the plate 10 and the wires 16 and 19 pass through them without touching them. The function of the guide members 21 and 22 is to provide means for preventing a workpiece from falling over so that it cannot be picked up.

A third stand-off 23 is rigidly attached to plate 10 and the end of the driving rod 16 is attached to it. The output rod 19 passes through the stand-off 23 without touching it.

A fourth stand-off 24 has a magnetostrictive output means 26 mounted thereon through which the rod 19 extends. A polarizing magnet 27 is attached to stand-off 24.

An amplitude indicating meter 28 receives an output from output means 26 through a lead 29. A lead 31 is attached to the signal generator 11 and supplies an electrical input to the input means 14.

A bracket 32 is attached to the plate 10 and rotatably supports a disc holding assembly, designated generally as 33. The disc holding assembly 33 comprises a main body portion 34 which has a recessed semi-circular groove 36 formed in its underside as best shown in Figure 2.

A bifurcated spring 37 is attached by a screw 38 to the underside of the member 33 and has a pair of engaging portions 39 and 41 adjacent its opposite end. A shaft 42 is slidably mounted in member 34 and has a traverse set screw 43 mounted therein. The member 34 is formed with a longitudinal slot 40 in which the set screw 43 may move. The screw 43 engages the free ends of the bifurcated spring 37 so as to cam them outwardly. A knurled head 45 is attached to shaft 42 and has a hollow sleeve 44 attached to it. A holding bracket 46 is attached to the base plate 10 adjacent the guides 21 and 22 and has an outwardly extending locking lip 47.

In operation, the knurled head 45 is pushed inwardly so as to move the pin 43 to cam the bifurcated legs of the spring 37 apart. A disc 41 is then placed into the hemispherical slot 36 and the knurled head 45 is pulled outwardly to release the pin 43 from the bifurcated spring. The tension of the spring will then hold the disc 41 in position.

The holding assembly 33 may then be pivoted over and the knurled head 45 may be pushed inwardly so that the sleeve 44 engages the locking lip 47. This cams the pin 43 between the spring 37 and releases the disc so that it falls down upon wires 16 and 19 between the guides 21 and 22.

Since there is no physical contact between the holding means 33 and the wires 16 and 19, there will be no damping of the disc 41. The signal generator is turned on and varied in frequency until the meter 28 indicates a maximum amplitude. The frequency of the generator at this point corresponds to the resonant frequency of the disc. This is the information desired. After the reading has been obtained, the knurled head 45 is pulled outwardly, thus allowing the spring 37 to once again clamp the disc and the member 33 is pivoted upwardly to the position shown in Figure 1. The knurled head 45 may then be pushed in to release the disc. If the frequency was lower than the desired frequency, the disc may be ground to a smaller size and the procedure repeated until the desired resonant frequency is obtained. It is to be realized, of course, that the guides 21 and 22 do not in normal operation contact the disc; however, in the event the disc becomes unbalanced and falls, they prevent it from moving into a position such that the jaws cannot clamp it. They also serve as a magnetic and mechanical shield for preventing interfering vibrations from affecting the apparatus.

It is seen that this invention provides means for quickly and easily measuring the frequency of a disc, and although it has been described with respect to a preferred embodiment thereof, it is not to be so limited as changes and modifications may be made therein which are within the full intended scope of the invention as defined by the appended claims.

We claim:

1. Apparatus for measuring the frequency of a disc comprising, a base plate, a disc holding assembly pivotally supported on said base plate and movable from an up to a down position, a releasable disc holding means on said disc holding assembly, a pair of stand-offs mounted on said base plate and positioned such that they are on opposite sides of said disc holding assembly when in its down position, a first magnetostrictive driving means connected to the first stand-off and comprising a driving coil, a first polarizing magnet, and a driving wire extending from said first stand-off parallel to the base plate toward the second stand-off, a magnetostrictive output means mounted on the second stand-off and comprising a second polarizing magnet, an output coil and an output wire extending parallel to said base plate and towards said first stand-off, said output and input wires spaced equidistant from each other and being in substantially the same horizontal plane, and actuating means mounted on said disc holding assembly for operating said releasable disc holding means, so that when said disc holding assembly is in said down position, a disc may be released to rest freely on said input and output wires, and the resonant frequency of said disc may be determined.

2. A disc holding and frequency measuring apparatus for discs comprising, a base plate, a magnetostrictive driving unit mounted on said base plate and comprising a driving coil and a driving wire extending through said driving coil and extending parallel to said base, a magnetostrictive output means comprising an output coil and an output wire extending through said output coil parallel to the base and mounted in the same horizontal plane as the driving wire and spaced therefrom a distance less than the diameter of the discs to be measured, a signal generator supplying an input signal to said input coil, an amplitude meter connected to said output coil, a disc holding assembly pivotally supported by said base plate and movable from a first position remote from said driving and output wires to a second position adjacent said driving and output wires, and said disc holding assembly comprising a pair of jaws comprising a bifurcated spring with engaging portions for removably receiving therebetween a disc to be measured and means movably mounted on said assembly for spreading said bifurcated spring so that it will release a disc upon the driving and output wires.

3. A disc holding and frequency measuring apparatus for discs comprising, a base plate, a magnetostrictive driving unit mounted on said base plate and comprising a driving coil and a driving wire extending through said driving coil and extending parallel to said base, a magnetostrictive output means comprising an output coil and an output wire extending through said output coil parallel to the base and mounted in the same horizontal plane as the driving wire and spaced therefrom a distance less than the diameter of the discs to be measured, a signal generator supplying an input signal to said input coil, an amplitude meter connected to said output coil, a bracket attached to said base plate, a main body portion pivotally supported by said bracket, said main body portion formed with a recessed semi-circular groove on the lower side thereof, a shaft supported in said body portion for longitudinal motion thereof, a slot formed in said body portion, a set screw received through said slot in said body portion and threadedly received in said shaft, a bifurcated spring attached to the lower side of said body portion and formed with a pair of engaging jaws, the set screw engageable with said bifurcated spring to spread the jaws, said body portion pivotal to a first position adjacent said driving and output wires so that a disc may be placed thereon, and said body portion pivotal to a second position away from said driving and output wires so that the disc may be removed.

References Cited in the file of this patent

UNITED STATES PATENTS

| 2,105,479 | Hayes | Jan. 18, 1938 |
| 2,461,543 | Gunn | Feb. 15, 1949 |
| 2,486,984 | Rowe | Nov. 1, 1949 |
| 2,615,981 | Doelz | Oct. 28, 1952 |